United States Patent
Oshins et al.

(10) Patent No.: US 9,483,294 B2
(45) Date of Patent: Nov. 1, 2016

(54) DEFERRING THE COST OF VIRTUAL STORAGE

(71) Applicant: Microsoft Corporation, Redmond, WA (US)

(72) Inventors: Jacob Oshins, Seattle, WA (US); John A Starks, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 334 days.

(21) Appl. No.: 13/925,835

(22) Filed: Jun. 25, 2013

(65) Prior Publication Data

US 2014/0380305 A1    Dec. 25, 2014

(51) Int. Cl.
*G06F 9/455*    (2006.01)

(52) U.S. Cl.
CPC . *G06F 9/45558* (2013.01); *G06F 2009/45579* (2013.01)

(58) Field of Classification Search
None
See application file for complete search history.

(56) References Cited

U.S. PATENT DOCUMENTS

| | | | |
|---|---|---|---|
| 7,870,356 B1 | 1/2011 | Veeraswamy et al. | |
| 7,900,005 B2 | 3/2011 | Kotsovinos et al. | |
| 8,122,212 B2 | 2/2012 | Otani et al. | |
| 8,195,611 B2 | 6/2012 | Adkins et al. | |
| 8,364,639 B1 | 1/2013 | Koryakina et al. | |
| 8,365,167 B2 | 1/2013 | Beaty et al. | |
| 8,370,819 B2 | 2/2013 | Chakraborty et al. | |
| 2012/0060005 A1 | 3/2012 | Sudhakar | |
| 2013/0007702 A1* | 1/2013 | Hoban | G06F 9/45516 717/114 |

OTHER PUBLICATIONS

"EMC Symmetrix VMAX Virtual Provisioning Space Reclamation and Application Considerations", Retrieved at <<www.emc.com/collateral/software/white-papers/h6730-virtual-provisioning-space-reclamation-wp.pdf>>, In White Paper of EMC2, Jan. 2013, pp. 41.
Hines, et al., "Post-Copy Live Migration of Virtual Machines", at <<citeseerx.ist.psu.edu/viewdoc/download?doi=10.1.1.184.3346&rep=rep1&type=pdf>>, In Newsletter of ACM SIGOPS Operating Systems Review, vol. 43, Issue 3, Jul. 2009, pp. 13.

* cited by examiner

*Primary Examiner* — Eric C Wai
(74) *Attorney, Agent, or Firm* — John Jardine; Dan Choi; Micky Minhas

(57) ABSTRACT

In one embodiment, a virtual storage system 200 may represent a file data set differently based on the activity being performed. The virtual storage system 200 may execute a runtime activity on a runtime format file 214 representing a file data set 212 on a virtual execution layer 220. The virtual storage system 200 may execute an interchange activity on an interchange format file 230 representing the file data set 232.

20 Claims, 9 Drawing Sheets

200

500

DEFERRING THE COST OF VIRTUAL STORAGE

BACKGROUND

Storage virtualization is the process of representing one kind of storage with a different kind. For example, a hypervisor may group together five disk drives and represent data across the five disk drives in one virtual disk drive so that the five disk drives are used in parallel when reading the data. Thus, the aggregate system may seem to operate faster than any one actual disk drive. The hypervisor may store the contents of a virtual disk in a hard disk file, allowing that file to be mounted as a disk directly.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to representing a file data set differently based on the activity being performed. The virtual storage system may execute a runtime activity on a runtime format file representing a file data set on a virtual execution layer. The virtual storage system may execute an interchange activity on an interchange format file representing the file data set.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, it should be understood that this is done for illustration purposes only. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a virtual storage system.

In a hypervisor, a file data set may be stored as a virtual file that is not very feature rich or be stored in a storage area network that is feature-rich, but device specific. The virtual storage system may solve this by storing a file data set in a runtime format when executing a runtime activity with a virtual execution layer and in an interchange format when executing an interchange activity. An interchange activity may migrate the file data set between data storages by taking the file data set offline. Having separated these two representations, the virtual storage system may defer many actions until the moment that the virtual file is moved. By deferring these actions, the virtual storage system may avoid executing writes for any block on the virtual disk that gets rewritten in between when the virtual disk file is mounted and dismounted.

Thus, in one embodiment, a virtual storage system may represent a file data set differently based on the activity being performed. The virtual storage system may execute a runtime activity on a runtime format file representing a file data set on a virtual execution layer. The virtual storage system may use a sparse version of the interchange format file to create a runtime format file representing the file data set. The virtual storage system may execute an interchange activity on an interchange format file representing the file data set.

Figure 1:
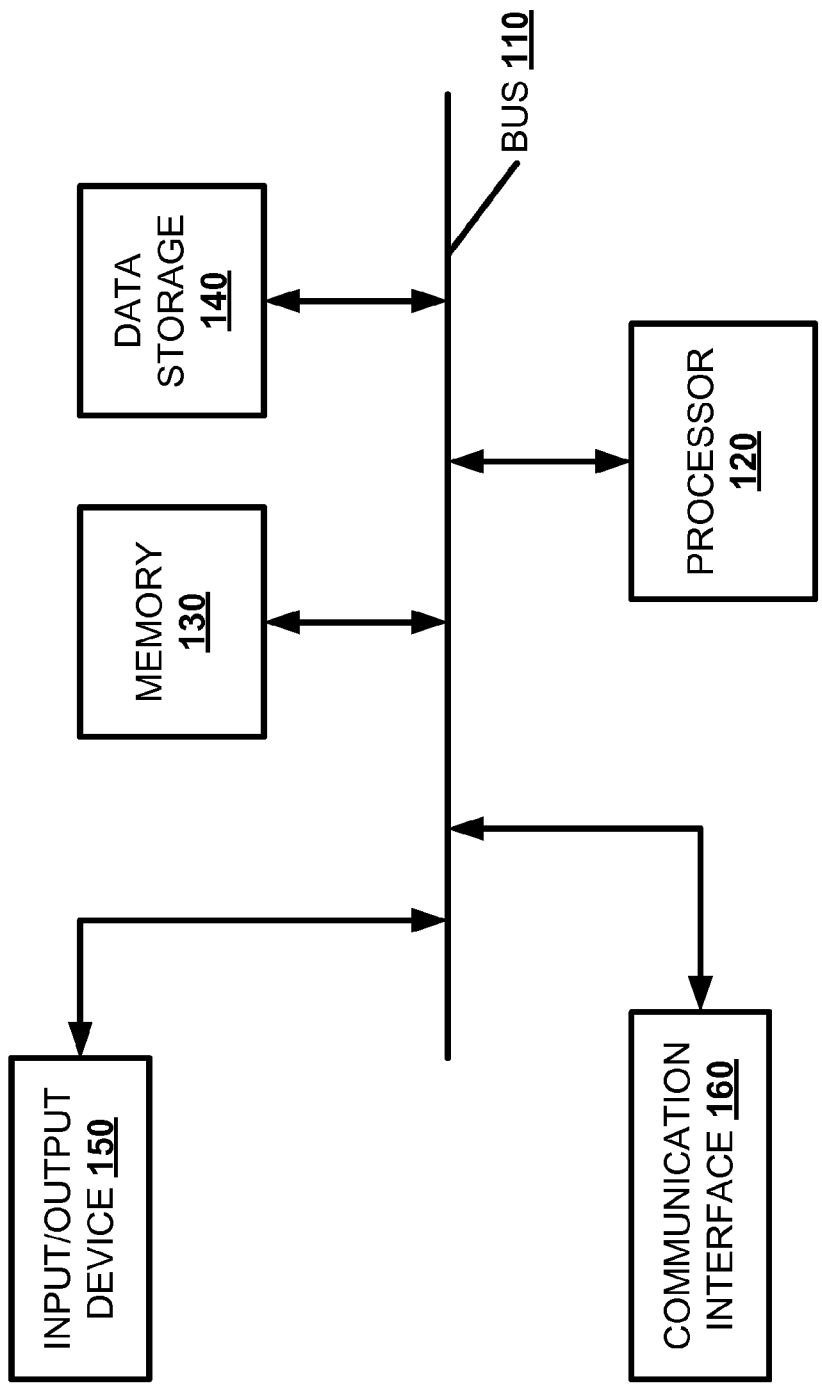
FIG. 1 illustrates, in a block diagram, one embodiment of a computing device.

FIG. 1 illustrates a block diagram of an exemplary computing device 100 which may act, alone or collectively networked, as a virtual storage system. The computing device 100 may combine one or more of hardware, software, firmware, and system-on-a-chip technology to implement a virtual storage system. The computing device 100 may include a bus 110, a processor 120, a memory 130, a data storage 140, an input/output device 150, and a communication interface 160. The bus 110, or other component interconnection, may permit communication among the components of the computing device 100.

The processor 120 may include at least one conventional processor or microprocessor that interprets and executes a set of instructions. The memory 130 may be a random access memory (RAM) or another type of dynamic data storage that stores information and instructions for execution by the processor 120. The memory 130 may also store temporary variables or other intermediate information used during execution of instructions by the processor 120. The data storage 140 may include a conventional ROM device or another type of static data storage that stores static information and instructions for the processor 120. The data storage 140 may include any type of tangible machine-readable medium, such as, for example, magnetic or optical recording media, such as a digital video disk, and its corresponding drive. A tangible machine-readable medium is a physical medium storing machine-readable code or instructions, as opposed to a signal. Having instructions stored on computer-readable media as described herein is distinguishable from having instructions propagated or transmitted, as the propagation transfers the instructions, versus stores the instructions such as can occur with a computer-readable medium having instructions stored thereon. Therefore, unless otherwise noted, references to computer-readable media/medium having instructions stored thereon, in this or an analogous form, references tangible media on which data may be stored or retained. The data storage 140 may store a set of instructions detailing a method that when executed by one or more processors cause the one or more processors to perform the method.

The input/output device 150 may include one or more conventional mechanisms that permit a user to input information to the computing device 100, such as a keyboard, a mouse, a voice recognition device, a microphone, a headset, a gesture recognition device, a touch screen, etc. The input/output device 150 may include one or more conventional mechanisms that output information to the user, including a display, a printer, one or more speakers, a headset, or a medium, such as a memory, or a magnetic or optical disk and a corresponding disk drive. The communication interface 160 may include any transceiver-like mechanism that enables computing device 100 to communicate with other devices or networks. The communication interface 160 may include a network interface or a transceiver interface. The communication interface 160 may be a wireless, wired, or optical interface.

The computing device 100 may perform such functions in response to processor 120 executing sequences of instructions contained in a computer-readable medium, such as, for example, the memory 130, a magnetic disk, or an optical disk. Such instructions may be read into the memory 130 from another computer-readable medium, such as the data storage 140, or from a separate device via the communication interface 160.

In order to continue to add features to a virtual disk stack while still keeping the virtual disk format simple, the runtime format of a virtual file may be divorced from the interchange format used for copying a virtual file to other storages. The interchange format may still preserve the existing management experience by managing and configuring the virtual execution layers in terms of the file data sets.

Figure 2:
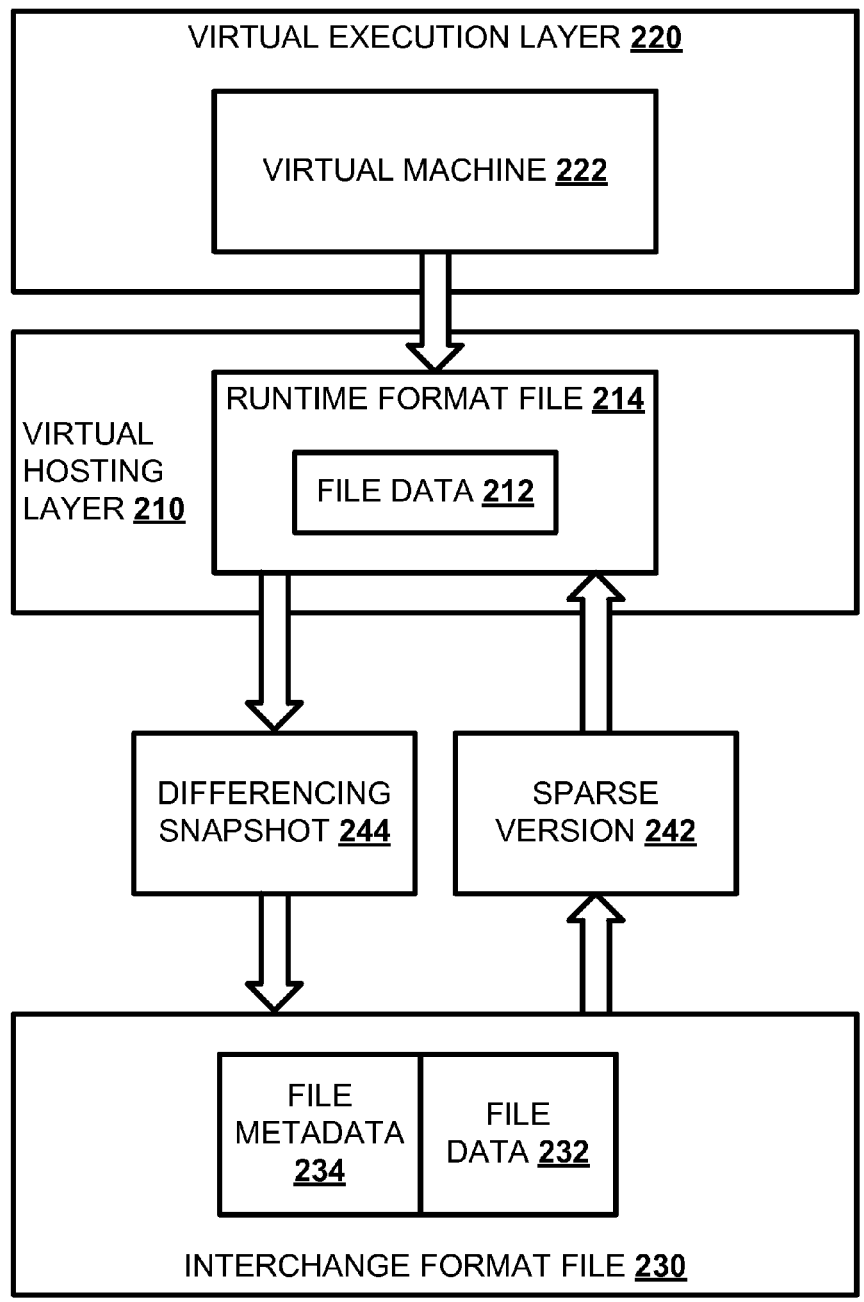
FIG. 2 illustrates, in a block diagram, one embodiment of a virtual storage system.

FIG. 2 illustrates, in a block diagram, one embodiment of a virtual storage system 200. A virtual storage system 200 may have one or more virtual layers, representing a level of abstraction of one or more storage devices for execution of a data process. A virtual hosting layer 210, such as a hypervisor, may support a virtual execution layer 220 that executes a runtime activity. A runtime activity is an activity performed in the course of executing an application or process. The virtual hosting layer 210 may be hosted by a lower virtual layer, just as a virtual execution layer 220 may host a higher virtual layer. The virtual execution layer 220 may execute a runtime activity on a runtime file data set 212.

The virtual execution layer 220 may provide an environment for a virtual machine 222 to perform a runtime activity. Alternately, the virtual execution layer 220 may execute the runtime activity without a virtual machine 222 being instantiated. For example, a storage area network may use the virtual execution layer 220 to act as an interface with a set of linked data storage facilities.

The virtual storage system 200 may use the virtual execution layer 220 to perform a runtime activity on the runtime file data set 212 by creating a runtime format file 214. The runtime format file 214 may be a sparse representation of the runtime file data set 212, forgoing any file metadata not used to execute the runtime activity. The virtual execution layer 220 may control the format of the runtime format file 214 to optimize execution by the virtual execution layer 220.

The virtual storage system 200 may create an interchange format file 230 to represent an interchange file data set 232 while performing an interchange activity. An interchange file data set 232 is a point in time version of the runtime file data set 212, and vice versa. An interchange activity is an activity performed as part of transitioning the stored data to a different storage location by taking the data offline. For example, an interchange activity may be a data transform, such as a compression transform, an encryption transform, a digital signing transform, or an attestation transform. A compression transform stores the interchange file data set 232 in a smaller file size for ease of transmission. An encryption transform encrypts the interchange file data set 232 to increase data security during transmission. A digital signing transform attaches a digital signature to the interchange file data set 232 to identify the originator of the interchange file data set 232. An attestation transform allows a user to detect changes made to the interchange file data set 232. The interchange format file 230 may have sufficient metadata in an interchange file metadata set 234 attached to the interchange file data set 232 to allow the interchange file data set 232 to be used on multiple platforms.

The virtual storage system 200 may execute a conversion process between the runtime format file 214 and the interchange format file 230. The virtual storage system 200 may take a sparse version 242 of the interchange format file 230 to create the runtime format file 214, forgoing any portion of the interchange file metadata set 234 not used to execute the runtime activity. The virtual storage system 200 may use one or more differencing snapshots 244 of the runtime format file 214 to guarantee the accuracy of the interchange format file 230. A differencing snapshot 244 catalogues any changes made to the runtime file data set 212. The virtual storage system 200 may use the differencing snapshots 244 to make any appropriate changes to the interchange file data set 232.

Preserving the existing administrative workflow while allowing new features in the virtual disk stack may involve two major structural changes. The first structural change may involve separating the storage virtualization implementation from the hypervisor service. The second structural change may involve extending the existing file system mini-filter in conjunction with the interchange format file 230 implementation so that the runtime format file 214 is separate from the interchange format file 230. The interchange format file 230 may subsequently be used for moving a file data set 232.

Figure 3:
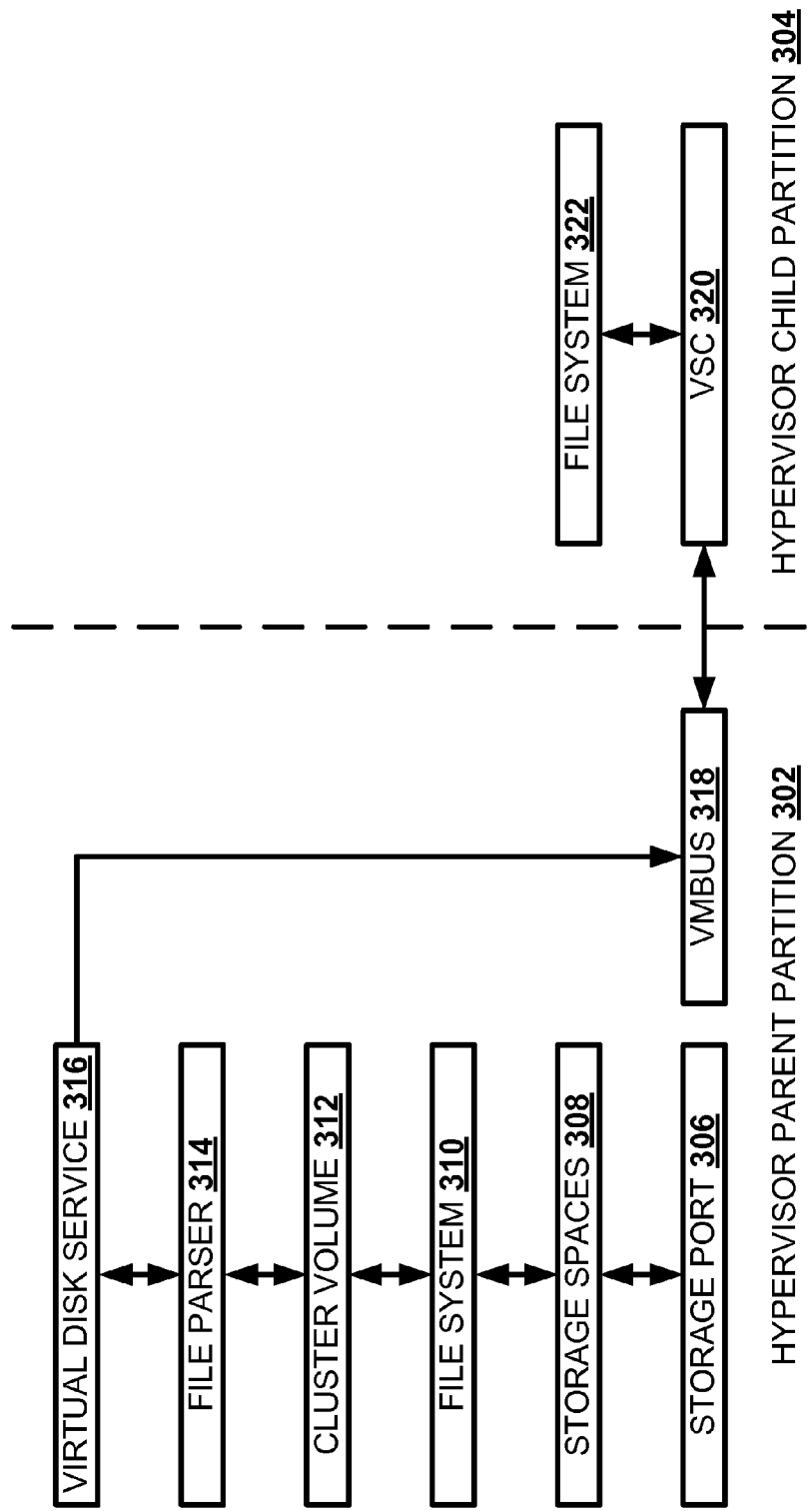
FIG. 3 illustrates, in a block diagram, one embodiment of a standard hypervisor storage path.

FIG. 3 illustrates, in a block diagram, one embodiment of a standard hypervisor storage path 300. In the standard hypervisor storage path 300, the hypervisor may partition the path into a parent partition 302 and a child partition 304. The parent partition 302 may be referred to as an input/output partition, a "domain 0", or a utility virtual machine. The child partition 304 may act as a guest virtual machine 222. The hypervisor may implement the storage code in the parent partition 302 or within the hypervisor itself.

A storage port 306 may receive the file data set to store on a block-oriented storage media, such as a disk. A set of one or more storage spaces 308 may store the file data set 232. A parent file system module 310 may configure and organize the file data set 232 for proper storage in the block-oriented storage media. A cluster shared volume file system module 312 may provide multiple nodes with simultaneous access to the parent file system module 310. The file data set parser 314 may parse the file data set 232. The virtual disk service module 316 may determine actions to be performed on the file data set 232 by the child partition 304. The virtual execution layer bus (VMBUS) 318 may provide the child partition 304 with access to the file data set 232 stored in the parent partition 302.

A virtualization service consumer 320 may manage the interaction between the parent partition 302 and the child partition 304. The virtualization service consumer 320 may use the virtual execution layer bus 318 to access the file data set 232 stored in the parent partition 302. The virtualization service consumer 320 may then pass that file data set 212 up to a child file system module 322. The child file system module 322, similar to the parent file system module 310, may configure and organize the file data set 212 for proper reference by the child partition 304. The child file system module 322 may divide the child file data set into files and overlay an organization structure on those files. The virtual hosting layer 210 may view these child files as a single virtual disk, while the execution layer views the individual child files.

Figure 4:
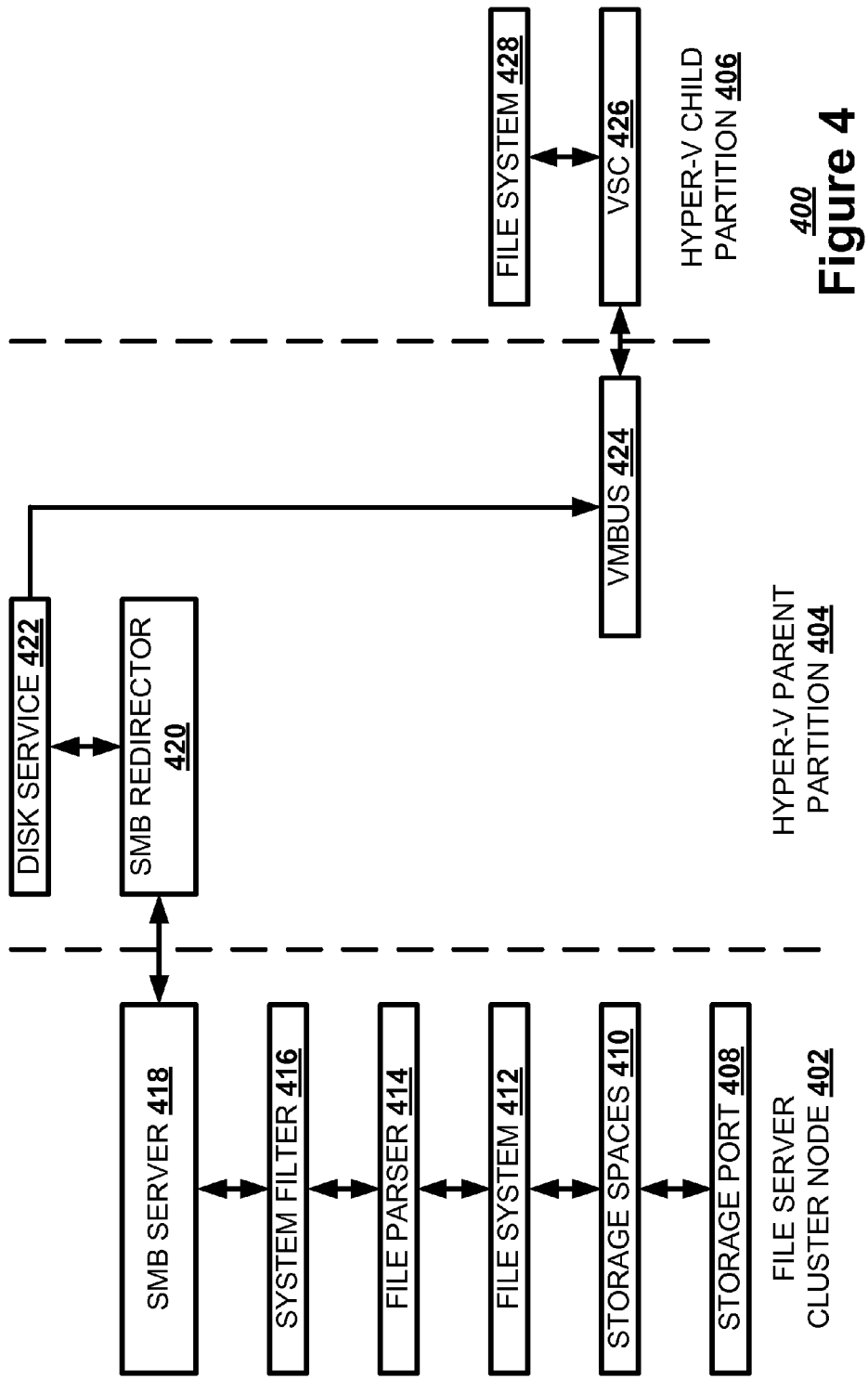
FIG. 4 illustrates, in a block diagram, one embodiment of a hypervisor using network-attached storage.

The interchange format file 230 may be stored on a separate file server. FIG. 4 illustrates, in a block diagram, one embodiment of a hypervisor 400 using network-attached storage. The hypervisor may have a file server cluster node 402 in addition to a parent partition 404 and a child partition 406. A storage port 408 may receive the file data set to store on a block-oriented storage media at the file server cluster node 402. A set of one or more storage spaces 410 may store the file data set. A server file system module 412 may configure and organize the file data set 232 for proper storage in the block-oriented storage media. The file data set parser 414 may parse the file data set 232 for a file system filter 416. The file system filter 416 allows most parsing of a file data set 232 to be located at the file server cluster node. The file system filter 416 may produce a file-based interface to a file data set 232. A server message block (SMB) server 418 may send block traffic to that file handle. By making this block traffic flow through the file system filter 416, the block traffic may be easily clustered.

A server message block (SMB) redirector 420 at the parent partition 404 may redirect traffic between a virtual disk service module 422 and the server message block server 418. The virtual disk service module 422 may determine actions to be performed on the file data set 232 by the child partition 406. The virtual execution layer bus (VMBUS) 424 may provide the child partition 406 with access to the file data set 232 stored in the file server cluster node 402.

A virtualization service consumer 426 may manage the interaction between the parent partition 404 and the child partition 406. The virtualization service consumer 426 may use the virtual execution layer bus 424 to access the file data set 232 stored in the parent partition 404. The virtualization service consumer 426 may then pass that file data set 212 up to a child file system module 428. The child file system module 428, similar to the parent file system module 412, may configure and organize the file data set 212 for proper storage in the child partition 406.

The file system filter 416 may further represent the relationships between virtual files in a "family" such as a snapshot tree. Furthermore, the combination of the file data set parser 414 and the file system filter 416 may draw a separation between the runtime representation of a virtual file and the interchange representation of that same virtual file.

By using the combination of either a storage space 410 and a server file system module 412 or a storage space 308 and a parent file system module 310, a virtual storage system 200 may "drop" a file data set 232 into the file system and create a much simpler file which contains only the runtime file data set 212, and not the virtual file metadata set 234. By using an offloaded data transfer technique the file data set 212 and the sparse virtual file may point to the same data blocks on disk, without duplication. Since the data may not be actually copied, the creation time for this new virtual disk representation may be short, allowing for a faster mounting of the virtual disk.

Once the on-disk representation is just a big sparse file with only the runtime file data set 212, manipulation of the interchange file metadata set 234, such as block reference count tracking, deduplication, and snapshots, becomes a file system topic, not a virtual disk topic. A virtual storage system 200 may take a snapshot of the runtime format file 214 by asking a child file system module 428 or a child file system module 322 to build a new file that is a snapshot of the existing one. Any of the existing snapshots of the virtual disk may be "lifted" into an interchange format file 230 on demand, by invoking the virtual disk service module 422 or the virtual disk service module 316 to create a differencing disk, or for that matter, a clone disk, of that snapshot on demand.

The virtual storage system 200 may avoid writing the same data twice, once in the virtual file and once in a replica log file. The virtual storage system 200 may ask the child file system module 428 or the child file system module 322 which set of blocks have changed between any two snapshots.

Figure 5:
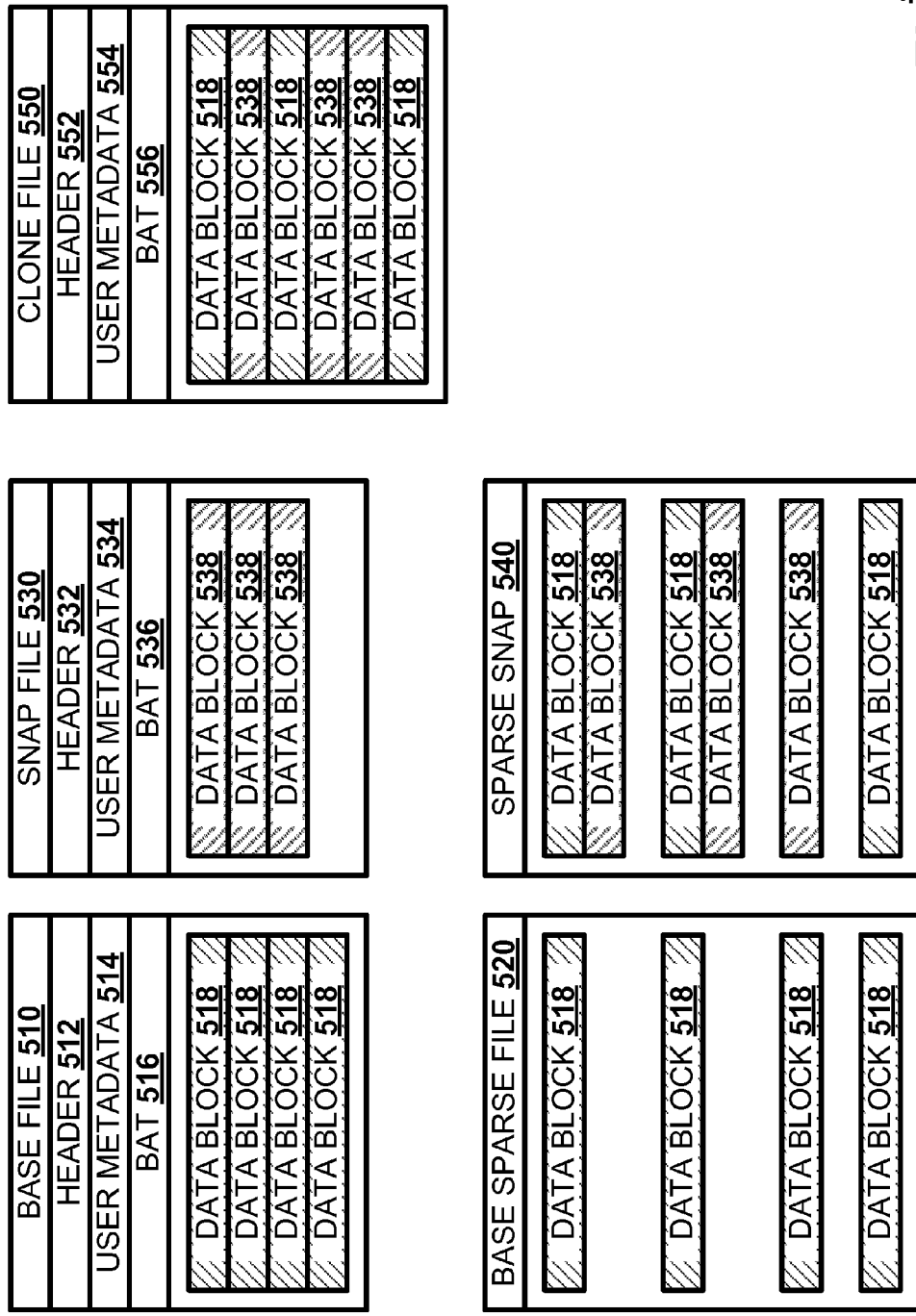
FIG. 5 illustrates, in a block diagram, one embodiment of a file mapping.

FIG. 5 illustrates, in a block diagram, one embodiment of a file mapping 500. A file server cluster node 402 may store a base virtual file 510. A base virtual file 510 may have a base header 512 identifying the base virtual file 510. A base metadata set 514 may describe the content, structure, configuration, and origins of the base virtual file 510. A base set of block address translations 516 may identify the location of one or more base data blocks 518 in the file server cluster node 402. Each base data block 518 may refer to the same on-disk data, rather than separate copies.

A virtual execution layer 220 may point to the base virtual file 510. The virtual storage system 200 may expose a set of new features, including guest snapshots to the virtual execution layer, triggering the virtual disk service module 422 to begin dropping the base virtual file 510 into a sparse base file 520.

When a guest virtual execution layer 220 takes a storage snapshot file 530, that storage snapshot file may be propagated downward to the server file system module 412, which creates the sparse snapshot file 540. A storage snapshot file 530 may have a snapshot header 532 identifying the storage snapshot file 530. A snapshot metadata set 534 may describe the content, structure, configuration, and origins of the storage snapshot file 530. A snapshot set of block address translations 536 may identify the location of one or more snapshot data blocks 538 in the file server cluster node 402. Each snapshot data block 538 may refer to the same on-disk data, rather than separate copies.

The file system filter 416 may expose the storage snapshot file 530 in the file system 412. The storage snapshot file 530 may not actually exist on-disk unless that virtual file is copied out of the file system 412. The child partition may delete the sparse snapshot file 540 without copying each snapshot data block 538 back into the base virtual file 510 or updating the base metadata set 514.

The creation of a storage snapshot file 530 may cause new writes to be done to a new region of the disk, rather than into the previously allocated blocks. To enable guest snapshots, particularly for shared virtual file disks, the virtual storage system 200 may configure the virtual execution layer 220 to not change when taking a storage snapshot. Each sparse snapshot file 540 may point to a specific virtual file, but the current running state of the virtual execution layer 220 may point instead to a "latest point in time" virtual file that is just a reparse point in the file system.

The virtual storage system 200 may export either a snapshot chain of associated storage snapshot files 530 or a clone of a specific snapshot. A clone file 550 may have a clone header 552 identifying the clone file 550. A clone metadata set 554 may describe the content, structure, configuration, and origins of the clone file 550. A clone set of block address translations 556 may identify the location of one or more base data blocks 518 and snapshot data blocks 538 in the file server cluster node 402. The base data blocks 518 and snapshot data blocks 538 may be gathered using the sparse version file 540.

Figure 6:
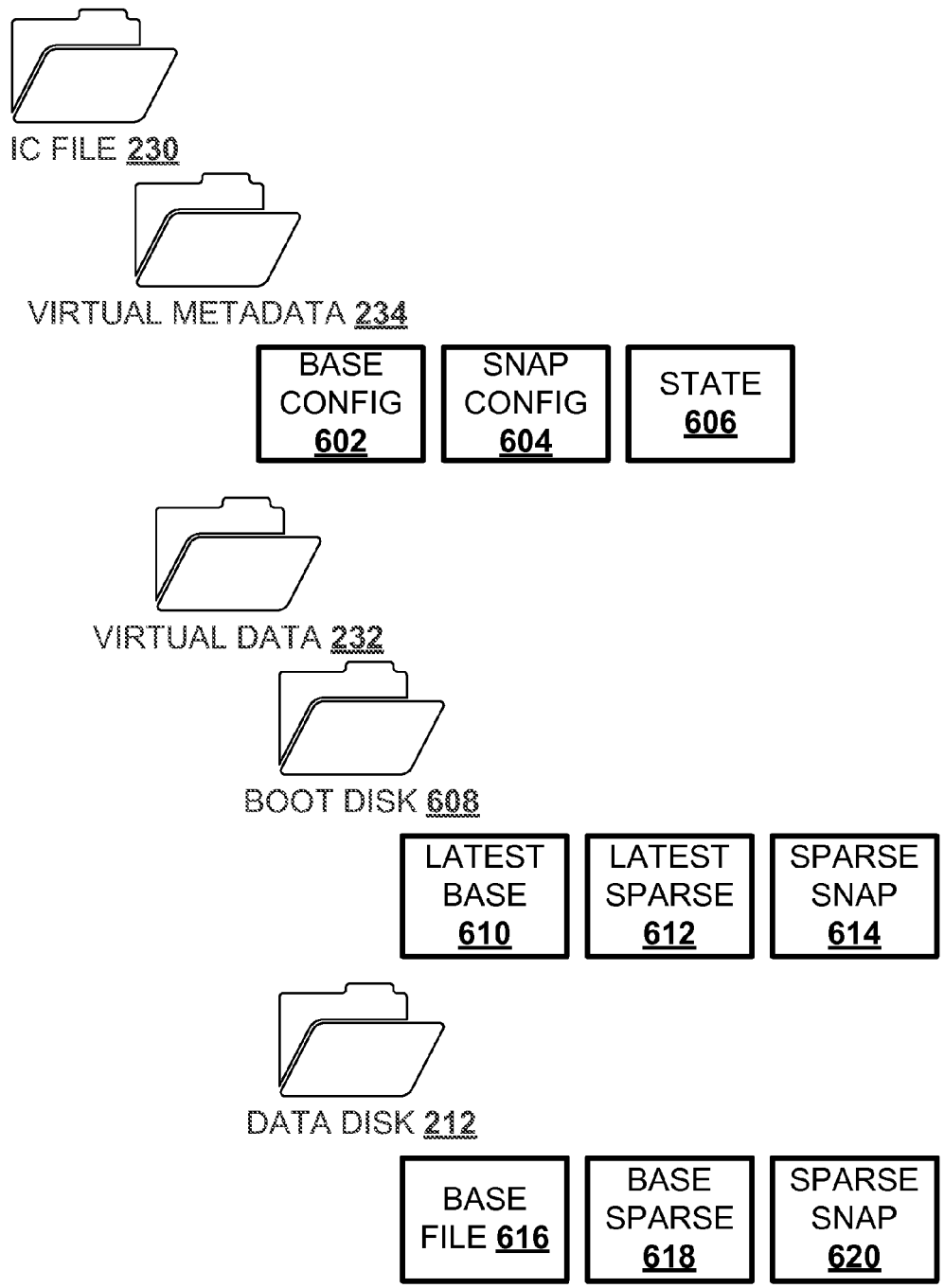
FIG. 6 illustrates, in a block diagram, one embodiment of a virtual execution layer file layout.

FIG. 6 illustrates, in a block diagram, one embodiment of a virtual file layout 600. For each interchange (IC) format file 230, a virtual storage system may associate that interchange format file 230 with a virtual file metadata set 234 and a runtime file data set 212. The virtual file metadata set 234 may have a base configuration 602, a snapshot configuration 604, and a saved state 606. The base configuration 602 may describe a configuration for the base virtual file 510. The snapshot configuration 604 may describe a configuration for the storage snapshot file 530. The save state 606 may describe the state of the virtual file 212.

The interchange file data set 232 may have a boot file data set 608 and a runtime file data set 212. The boot file data set 608 may have a latest base version 610 of the base virtual file 510, a latest sparse version 612 of the sparse base file 520, and the latest sparse snapshot 614 of the sparse snapshot file 540. The runtime file data set 212 may have a base data set 616 for the base virtual disk file 510, the sparse base data set 618 for the sparse base file 520, and the sparse snapshot 620 for the sparse snapshot file 540.

Use of the runtime format file 214 and the interchange format file 230 allow other functions of the underlying storage layers to be exposed up the stack and into the virtual execution layer 220, such as separating storage into tiers, integrity streams, and encryption offloads. Virtualization may intentionally hide the details of the underlying hardware. A virtual storage system 200 may divorce the state of the application and the operating system from the state of the executing machine. Thus, the virtual storage system may move a virtual execution layer from one executing machine to another, changing available resources during runtime or to replicate the virtual execution layer on another machine. The specific capabilities of the physical infrastructure may be made available by creating a purely virtual representation of hardware resources mapped onto the physical infrastructure. Thus, the virtual disk exposed in the virtual execution layer may expose the protocol representing the disk like a storage space 410.

A server file system module 412 may provide an underlying representation of a storage space 410, exposing the features of the storage space 410. Exposing a disk that has the semantics of a storage space 410 within a virtual execution layer may seem like a storage pace 410 with one copy of the data. Migrating to storage that actually supports multiple copies and integrity streams may cause the storage space 410 within the virtual execution layer to report that redundant copies now exist.

Figure 7:
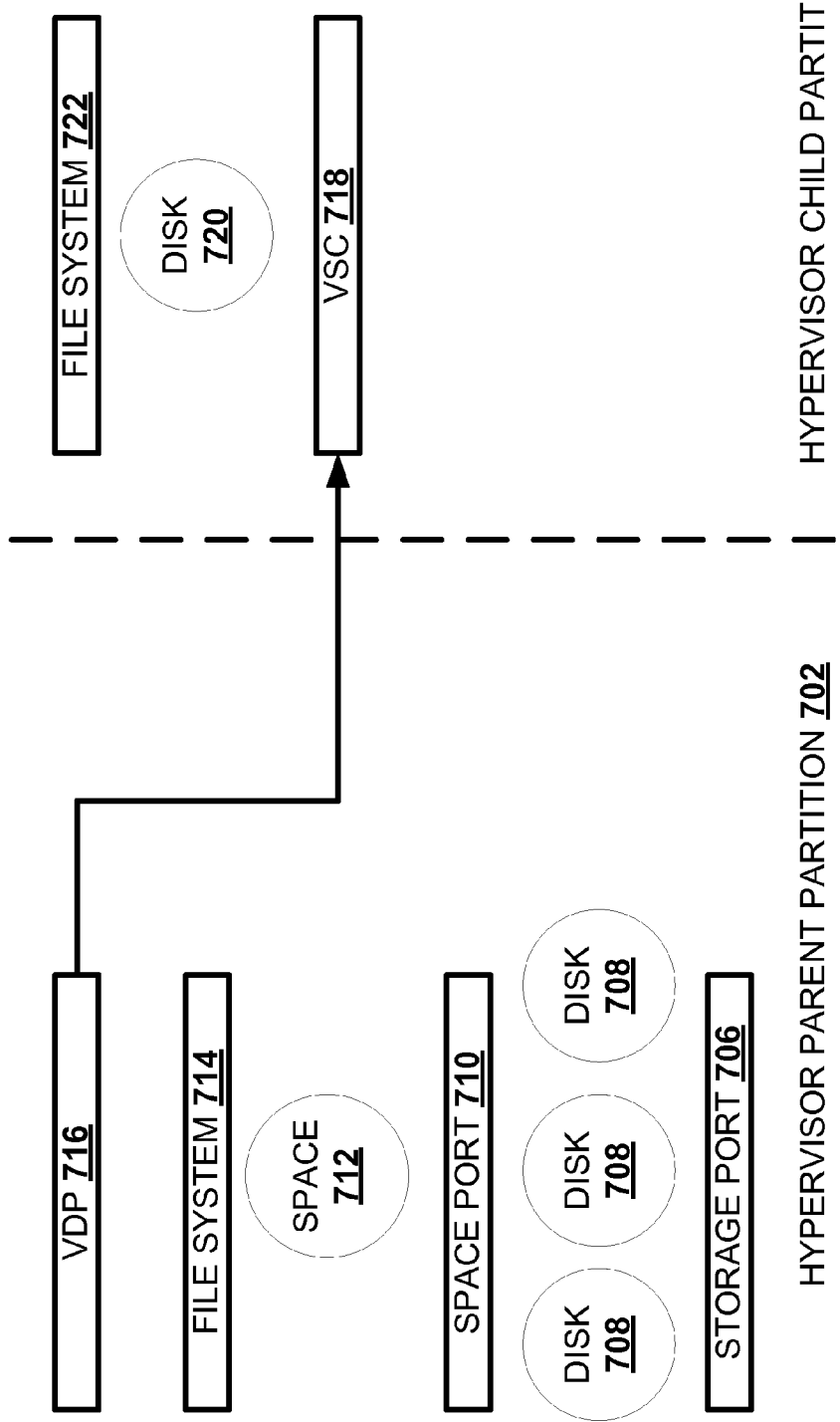
FIG. 7 illustrates, in a block diagram, one embodiment of an exposed hypervisor storage path.

FIG. 7 illustrates, in a block diagram, one embodiment of a hypervisor storage path 700 with exposed storage spaces. This exposed hypervisor storage path 700 may have a parent partition 702 and a child partition 704. A storage port 706 may receive the file data set 232 to store on a block-oriented storage media. A set of one or more disks 708 may store the file data set 232. A space port 710 may present the data file set 232 to a storage space 712. A parent file system module 714 may configure and organize the file data set 232 for proper storage in the block-oriented storage media. The virtual disk port (VDP) 716 may present the configured file data set 232 to a virtualization service consumer 718 in the child partition 704. The virtualization service consumer 718 may manage the interaction between the parent partition 702 and the child partition 704. The virtualization service consumer 718 may store the file data set 212 in a disk 720, seeming like a storage space. A child file system module 722 may access the file data set 212 in the disk 20. The child file system module 722 may configure and organize the file data set 212 for proper storage in the block-oriented storage media.

Figure 8:
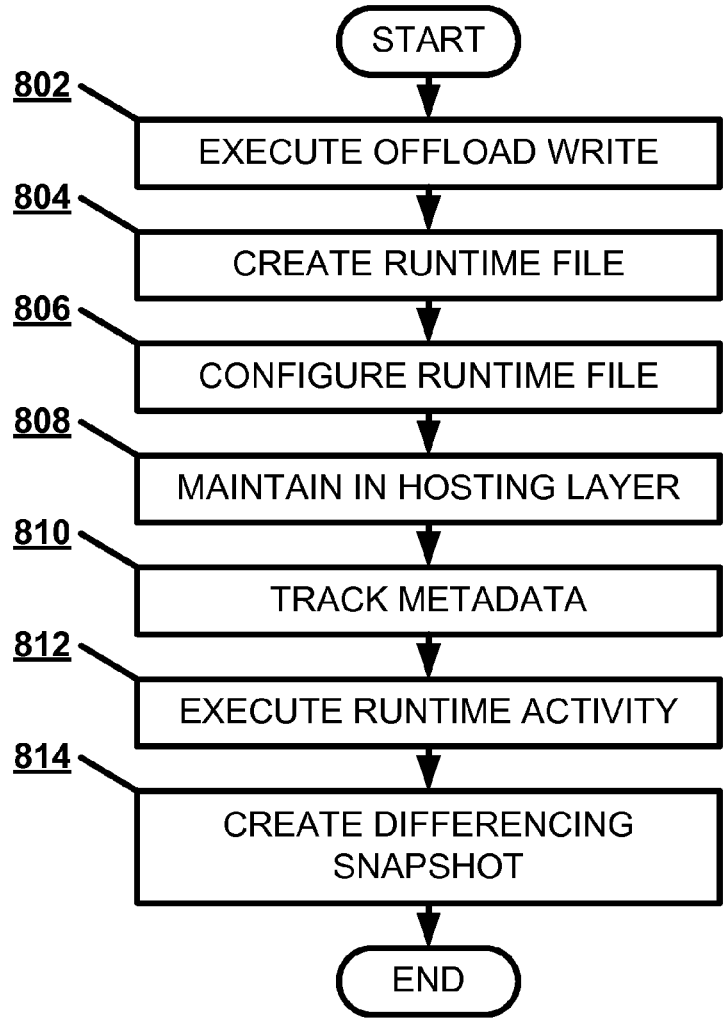
FIG. 8 illustrates, in a flowchart, one embodiment of a method executing a runtime activity.

FIG. 8 illustrates, in a flowchart, one embodiment of a method 800 executing a runtime activity. The virtual storage system 200 may execute an offloaded write to create a runtime format file 214 (Block 802). An offloaded write is a write that occurs without copying the actual data, as executed by such technology as an offloaded data transfer (ODX). The virtual storage system 200 may create the runtime format file 214 as a sparse version 242 of an interchange format file 230 (Block 804). The virtual storage system 200 may configure the runtime format file 214 to execute optimally in the virtual execution layer 220 (Block 806). The virtual storage system 200 may maintain the runtime format file 214 in a virtual hosting layer 210 (Block 808). The virtual storage system 200 may track a file metadata set 234 for the file data set 212 with a file system, such as a child file system module 322 or a child file system module 428, during the runtime activity (Block 810). The virtual storage system 200 may execute on a virtual execution layer 220 a runtime activity on a runtime format file 214 representing a file data set 212 (Block 812). The virtual storage system 200 may create a differencing snapshot 244 for the interchange format file 230 based on a cloned runtime format file 214, such as by comparing a current cloned runtime format file 214 and a previous cloned runtime format file 214 (Block 814).

Figure 9:
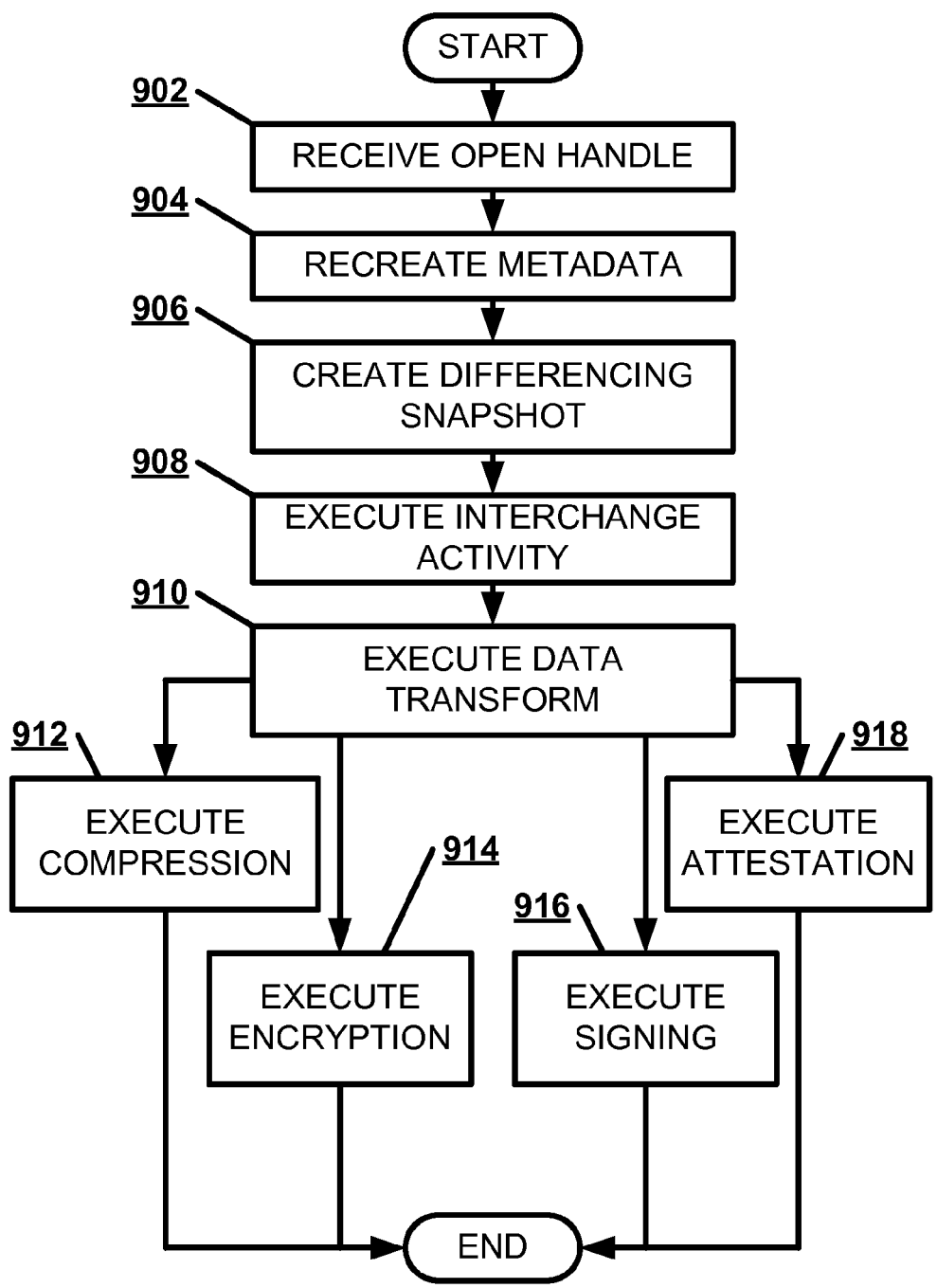
FIG. 9 illustrates, in a flowchart, one embodiment of a method executing an interchange activity.

FIG. 9 illustrates, in a flowchart, one embodiment of a method 900 executing an interchange activity. A virtual storage system 200 may receive an open handle request to the runtime format file 214 (Block 902). The virtual storage system 200 may recreate a file metadata set 234 for the interchange format file 230 from a file system in the virtual hosting layer 210, such as a parent file system module 310 or a server file system module 412, upon receiving the open handle request to the runtime format file 214 (Block 904). The virtual storage system 200 may create a differencing snapshot 244 for the interchange format file 230 based on a cloned runtime format file 214 (Block 906). The virtual storage system 200 may execute an interchange activity on an interchange format file 230 representing the file data set 232 (Block 908). The virtual storage system 200 may execute a data transform on the interchange format file 230 (Block 910). For example of a data transform, the virtual storage system 200 may execute a compression transform on the interchange format file 230 (Block 912). The virtual storage system 200 may execute an encryption transform on the interchange format file 230 (Block 914). The virtual storage system 200 may execute a digital signing transform on the interchange format file 230 (Block 916). The virtual storage system 200 may execute an attestation transform on the interchange format file 230 (Block 918).

Although the subject matter has been described in language specific to structural features and/or methodological acts, it is to be understood that the subject matter in the appended claims is not necessarily limited to the specific features or acts described above. Rather, the specific features and acts described above are disclosed as example forms for implementing the claims.

Embodiments within the scope of the present invention may also include computer-readable storage media for carrying or having computer-executable instructions or data structures stored thereon. Such computer-readable storage media may be any available media that can be accessed by a general purpose or special purpose computer. By way of example, and not limitation, such computer-readable storage media can comprise RAM, ROM, EEPROM, CD-ROM or other optical disk storage, magnetic disk storage or other magnetic data storages, or any other medium which can be used to carry or store desired program code means in the form of computer-executable instructions or data structures. Combinations of the above should also be included within the scope of the computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
executing a runtime activity on a file data set on a virtual execution layer using a runtime format file representing the file data set optimized to perform the runtime activity;
creating a differencing snapshot based on a cloned runtime format file for an interchange format file that represents the file data set and has an interchange file metadata set additional to the runtime format file allowing the file data set to be used on multiple platforms; and
executing an interchange activity to migrate a file data set between data storages using the interchange format file.

2. The method of claim 1, further comprising:
maintaining the runtime format file in a virtual hosting layer.

3. The method of claim 1, further comprising:
creating the runtime format file as a sparse version of the interchange format file.

4. The method of claim 1, further comprising:
executing an offloaded write to create the runtime format file.

5. The method of claim 1, further comprising:
tracking a file metadata set for the file data set with a file system during the runtime activity.

6. The method of claim 1, further comprising:
recreating a file metadata set for the interchange format file from a file system in a virtual hosting layer.

7. The method of claim 1, further comprising:
recreating a file metadata set for the interchange format file upon receiving an open handle request to the runtime format file.

8. The method of claim 1, further comprising:
executing a data transform on the interchange format file.

9. The method of claim 1, further comprising:
executing at least one of a compression transform, an encryption transform, a digital signing transform, and an attestation transform on the interchange format file.

10. A tangible machine-readable medium having a set of instructions detailing a method stored thereon that when executed by one or more processors cause the one or more processors to perform the method, the method comprising:
executing a runtime activity on a file data set on a virtual execution layer using a runtime format file representing the file data set optimized to perform the runtime activity;
creating, from a file system, an interchange file metadata set additional to the runtime format file allowing the file data set to be used on multiple platforms;
creating a differencing snapshot based on a cloned runtime format file for an interchange format file representing the file data set; and
executing an interchange activity to migrate a file data set between data storages using an interchange format file and having the interchange file metadata set.

11. The tangible machine-readable medium of claim 10, wherein the method further comprises:
maintaining the runtime format file in a virtual hosting layer.

12. The tangible machine-readable medium of claim 10, wherein the method further comprises:
executing an offloaded write to create the runtime format file.

13. The tangible machine-readable medium of claim 10, wherein the method further comprises:
tracking a file metadata set for the file data set with a file system during the runtime activity.

14. The tangible machine-readable medium of claim 10, wherein the method further comprises:
creating the runtime format file as a sparse snapshot of the interchange file format.

15. The tangible machine-readable medium of claim 10, wherein the method further comprises:
executing a data transform on the interchange format file.

16. The tangible machine-readable medium of claim 10, wherein the method further comprises:

executing at least one of a compression transform, an encryption transform, a digital signing transform, and an attestation transform on the interchange format file.

17. A virtual storage system, comprising:
a memory configured to maintain a file data set in a virtual hosting layer;
a processor configured to:
- execute a runtime activity on the file data set on a virtual execution layer using a runtime format file representing the file data set optimized to perform the runtime activity;
- create a differencing snapshot based on a cloned runtime format file for an interchange format file that represents the file data set and has an interchange file metadata set additional to the runtime format file allowing the file data set to be used on multiple platforms; and
- execute an interchange activity to migrate a file data set between data storages using the interchange format file.

18. The virtual storage system of claim 17, wherein the processor is configured to execute an offloaded write to create the runtime format file.

19. The virtual storage system of claim 17, wherein the processor is configured to track a file metadata set for the file data set with a file system during the runtime activity.

20. The virtual storage system of claim 17, wherein the processor is configured to create the runtime format file as a sparse snapshot of the interchange file format.

* * * * *